United States Patent
Roth-Stielow et al.

(10) Patent No.: US 6,291,952 B1
(45) Date of Patent: Sep. 18, 2001

(54) METHOD AND CIRCUIT ARRANGEMENT FOR OPERATING AN ELECTROMAGNETICALLY ACTUATED MECHANICAL BRAKE OF AN ELECTRIC MOTOR

(75) Inventors: Jörg Roth-Stielow, Bretten; Josef Schmidt, Graben-Neudorf, both of (DE)

(73) Assignee: Sew-Eurodrive GmbH & Co., Bruchsal (DE)

( * ) Notice: Subject to any disclaimer, the term of this patent is extended or adjusted under 35 U.S.C. 154(b) by 0 days.

(21) Appl. No.: 09/486,426

(22) PCT Filed: Aug. 25, 1998

(86) PCT No.: PCT/EP98/05395

§ 371 Date: Apr. 28, 2000

§ 102(e) Date: Apr. 28, 2000

(87) PCT Pub. No.: WO99/10975

PCT Pub. Date: Mar. 4, 1999

(30) Foreign Application Priority Data

Aug. 25, 1997 (DE) ................................ 197 36 940
Sep. 11, 1997 (DE) ................................ 197 40 016

(51) Int. Cl.⁷ ................................ H02P 3/18; H02P 3/04
(52) U.S. Cl. ................................ 318/375; 318/370; 318/366; 318/138
(58) Field of Search ................................ 318/369–380, 318/366, 246, 245, 365; 188/170; 303/20, 24 A; 361/103, 24, 27

(56) References Cited

U.S. PATENT DOCUMENTS

| | | |
|---|---|---|
| 3,947,740 * | 3/1976 | Tsuboi . |
| 3,985,210 * | 10/1976 | Hodge et al. . |
| 4,035,692 * | 7/1977 | Luy et al. . |
| 4,173,732 * | 11/1979 | Anderson . |
| 4,196,936 * | 4/1980 | Snyder . |
| 4,203,046 * | 5/1980 | Homann et al. . |
| 4,216,420 * | 8/1980 | Jinbo et al. . |
| 5,327,055 * | 7/1994 | Danielson et al. . |
| 5,528,445 * | 6/1996 | Cooke et al. . |
| 5,708,333 * | 1/1998 | Kirn . |
| 6,081,086 * | 6/2000 | Roth-Stielow et al. . |
| 6,141,199 * | 10/2000 | Fornari . |

FOREIGN PATENT DOCUMENTS

| | | |
|---|---|---|
| 0 242 671 A | 10/1987 | (EP) . |
| 0 575 023 A | 12/1993 | (EP) . |
| 62-277081 * | 12/1987 | (JP) . |

OTHER PUBLICATIONS

Patent Abstract of Japan 63290179 publication date Nov. 28, 1988.

Patent Abstract of Japan 56132191 publication date Oct. 16, 1981.

* cited by examiner

*Primary Examiner*—Paul Ip
(74) *Attorney, Agent, or Firm*—Marshall, O'Toole, Gerstein, Murray & Borun

(57) ABSTRACT

Electric motors, in particular geared motors, are often equipped with electromagnetically actuated mechanical brakes. In order to ensure that an excitation coil (3) can be operated with alternating-current mains supplies of various voltages, it is proposed to generate a unipolar voltage that varies over time with a certain period by means of a voltage source (2), the output voltage of which is positive and different from zero in a first time segment of this voltage period and in this first time segment has a maximal value, and in a second segment of the voltage period is zero or approaches zero. To pass an excitation current from the voltage source (2) to the excitation coil (3), a current path (15) is provided that is opened substantially at the beginning of the first time segment. The current path (15) is blocked again at a certain point within the first time segment, this point being selected such that the excitation current does not exceed a predetermined maximal value. During a time span in which the excitation coil (3) is or should be permanently excited, the opening and blocking of the current path are repeated in each voltage period.

45 Claims, 9 Drawing Sheets

METHOD AND CIRCUIT ARRANGEMENT FOR OPERATING AN ELECTROMAGNETICALLY ACTUATED MECHANICAL BRAKE OF AN ELECTRIC MOTOR

The invention relates to a method and a circuit arrangement for the operation of an electromagnetically actuated mechanical brake of an electric motor, in particular a geared motor.

BACKGROUND OF THE INVENTION

Electric machines, in particular electric motors, can be very well controlled with respect to their rotational speed. One known means of improving this basic controllability is to provide mechanical brakes, which can be released or raised by means of an electromagnetic apparatus. While the electric motor is in operation, the current powering the electric motor is also supplied to an excitation coil of the electromagnetically actuated mechanical brake. When no current is thus supplied, the electric motor is immobilized by application of a spring force to the brake.

Furthermore, a known means of powering electric motors is by a mains supply of alternating or polyphasic current. In this case, if the motor incorporates an excitation coil operated by direct current, converters or rectifiers are employed. Because the operating voltages of a.c. or polyphasic mains vary in different parts of the world, this equipment is manufactured and marketed in a number of variants, with excitation coils for different operating voltages. For the same reason, diverse rectifier circuit arrangements are produced. In order to reduce costs by increasing the production output, efforts are already being made to introduce a rectifier circuit arrangement that can be operated in several voltage categories that are used globally. However, because the amplitude of the unipolar voltage generated by the circuit arrangement depends on the a.c. voltage amplitude, the excitation coil of the electromagnetically actuated mechanical brake must be selected to be entirely compatible with the mains voltage available at the site where the brake is to be used.

The object of the invention is to develop a method and a circuit arrangement for the operation of an electromagnetically actuated mechanical brake of an electric motor, in particular a geared motor, in such a way that the same type of excitation coil can be used with a.c. or three-phase mains supplies of different voltages.

SUMMARY OF THE INVENTION

The invention thus is concerned with a method for operating an electromagnetically actuated mechanical brake for an electric motor, in particular a geared motor, with an excitation coil to actuate the brake, in particular to raise it, and with an alternating-current mains supply, i.e. one that delivers a mains voltage. the amplitude of which varies cyclically, wherein the excitation coil has a time constant corresponding to a ratio of a coil inductivity and an ohmic coil resistance.

So that the brake can be operated with a broad range of mains voltages, a unipolar voltage that changes with a specified period is produced by a voltage source.

The unipolar voltage in a first time segment of its period is positive and different from zero and in this first time segment has a maximal value, and in a second time segment of its period is zero or at least approaches zero.

A current path for an excitation current from the voltage source to the excitation coil is opened substantially at the beginning of the first time segment.

The current path is subsequently blocked, at a particular moment within the first time segment which is specified to be such that the excitation current does not exceed a predetermined maximal level.

During a time span in which the excitation coil is or should be permanently excited, the current path is opened and blocked repeatedly, once in each voltage cycle.

Preferably the unipolar voltage is produced by a rectifier unit in the voltage source that acts on a single-phase mains input from the a.c. mains supply, in such a way that the first time segment is equal to almost the entire period of the a.c. cycle, so that the second segment is extremely short, and the voltage period corresponds to half of the a.c. period.

Alternatively, the first and the second segment can each correspond to half of the voltage period, and half of the period of the a.c. cycle.

Preferably the current path is controlled by way of the main current electrodes of an electronic one-way valve that can be turned on and off by means of a controlled element, the current path being opened when the one-way valve is turned on and being blocked when the one-way valve is turned off. While the one-way valve is off, a discharge current from the excitation coil passes through a free path parallel to the excitation coil, with a decay time course corresponding substantially to the time constant of the excitation coil.

The current path is opened when the unipolar voltage, rising from zero, first reaches a positive threshold value which is considerably lower than the maximal value.

In a first embodiment of the invention the excitation current is measured and the current path is blocked when the excitation current, as it increases from lower values after the current path has been opened, first reaches a predetermined first threshold maximum.

In a second embodiment of the invention the unipolar voltage is measured and an integral thereof is obtained as the unipolar voltage rises from zero during the first time segment, after the current path has been opened; the current path is blocked when this gradually increasing integral value first exceeds a predetermined second threshold maximum, which is so specified that the excitation current does not exceed a predetermined maximal level.

In a third embodiment of the invention the unipolar voltage is measured and, by way of a first-order delay element, a first weighted measure of the unipolar voltage is obtained; here the current path is blocked when this first weighted measure, as it increases from lower values after the current path has been opened, for the first time exceeds a predetermined third threshold maximum. In this case a time constant of the delay element is adjusted to substantially correspond to the duration of the first time segment and the third threshold maximum is set such that the excitation current does not exceed a predetermined maximal value.

In a fourth embodiment of the invention a voltage that exists along the excitation coil is measured and by way of a firstorder delay element a weighted measure of this voltage is obtained, the current path being blocked when the second weighted measure, as it increases from lower values after the current path has been opened, for the first time exceeds a predetermined fourth threshold maximum. Here a time constant of the first-order delay element is adjusted to substantially correspond to the time constant of the excitation coil, preferably being twice as long as the period of the unipolar voltage, and the fourth threshold maximum is specified such that the excitation current does not exceed a predetermined maximal value. In this way an "image", so to speak, of the current flowing through the excitation coil is obtained, so that no direct current measurement is needed. This makes the circuit less elaborate.

In all of these embodiments the current flowing through the excitation coil is adjusted to a value that corresponds to the requirements of the brake.

Preferably in the first to fourth embodiments the preetermined threshold maximum is changed depending on the operating state of the brake, in particular depending on whether the brake is being raised or is being kept in the raised state, so that the operating state of the brake (being raised or held up) is taken into account. Preferably when the current begins to flow for the first time in order to raise the brake, for a certain time span (the elevation interval) the predetemined threshold maximum is readjusted to a level higher that than for holding the brake up, so that the raising process is accelerated. This elevation interval is preferably longer than or equal to the time constant of the excitation coil or at least twice as long as the period of the unipolar voltage.

When the one-way valve is used, to provide protection from transient overvoltages, regardless of other control signals the one-way valve is always turned on whenever a voltage between its main current electrodes, as a result of the transient overvoltage, exceeds an overvoltage limit that is higher than the maximal value of the unipolar voltage expected in normal operation; as a result, the overvoltage is reduced by way of the excitation coil.

Furthermore, the one-way valve is turned on whenever a positive voltage is applied to its controlled element and is turned off whenever a negative or zero voltage is applied to the controlled element, the arrangement being such that to turn on the one-way valve the unipolar voltage is sent to the controlled element by way of at least one ohmic resistance and the positive control voltage is preferably limited by a bipolar transistor.

In both cases, to turn off the one-way valve the controlled element is short-circuited by way of at least one ohmic resistance and an electronic switch.

The elevation interval mentioned above, during which the current flow is increased as the brake is being raised, is controlled by a timing element in such a way that the elevation interval begins when, as a result of the mains voltage from the a.c. mains being turned on to raise the brake, the unipolar voltage for the first time reaches a predetermined threshold value that is considerably lower than the maximal value.

In the second embodiment of the invention the integral value during the second time segment is reset to zero.

In the fourth embodiment of the invention the first-order delay element is connected to the voltage that exists along the excitation coil during opening of the current path, and is short-circuited at its input side by way of an electronic switch during blockade of the current path.

With regard to the associated apparatus, the invention relates to a circuit arrangement for the operation of an electromechanically actuated mechanical brake for an electric motor, in particular a geared motor, by mains supplies within a broad range of voltages, comprising an excitation coil with terminal connectors, which has a time constant corresponding to a ratio of a coil inductivity and an ohmic coil resistance, for the purpose of actuating and in particular raising the brake;
an alternating-current mains supply, the voltage of which alternates with an a.c. period;
a voltage source to produce a unipolar voltage that changes with a certain period, being positive and different from zero in a first time segment of the voltage period, during which it has a maximal value, and being zero or at least approaching zero in a second time segment of the period;
a current path for an excitation current, which leads from the voltage source to the excitation coil and back;
an electronic one-way valve with main current electrodes across which the current path leads so that the current path can be opened and blocked, and with a controlled element for turning the one-way valve on and off;
a control circuit connected to the controlled element and so constructed that the one-way valve is turned on substantially at the beginning of the first time segment in order to open the current path and is turned off at a certain moment within the first time segment in order to close the current path,
the control circuit further being so constructed that the excitation current does not exceed a preset maximal value and during a time span in which the excitation coil is or should be permanently excited, the turning on and off of the one-way valve to open and block the current path is repeated in consecutive voltage cycles.

Preferably the voltage source is connected at its input side to a single-phase voltage supply from the a.c. mains and comprises a diode-bridge circuit, so that the first time segment comprises substantially the entire period of the a.c. cycle, so that the second time segment is very short and the voltage period corresponds substantially to half the a.c. period.

Alternatively, the voltage source comprises a diode-midpoint circuit, so that the first and the second time segment each correspond to half the voltage period as well as half the a.c. period.

In addition, in parallel to the terminal connectors of the excitation coil there is preferably connected a free-run path with a circuit arrangement to discharge the excitation coil after the current path has been blocked, with a discharge time constant corresponding to the time constant of the excitation coil.

A voltage meter is preferably provided to monitor the unipolar voltage, as well as a threshold element to preset a positive threshold value, such that the controlling device turns on the one-way valve to open the current path whenever the unipolar voltage, rising from zero, first reaches the positive threshold value, which is considerably lower than the maximal value.

A first embodiment of the invention comprises a current meter to produce a current signal that corresponds to the excitation current, and a threshold element to preset a first threshold maximum, such that the control circuit turns off the one-way valve to block the current path when the current signal, as it rises from lower values after the current path has been opened, first reaches the first threshold maximum.

A second embodiment of the invention comprises an integrator element to form an integral of the unipolar voltage as it rises from zero during the first time segment and a threshold element to preset a second threshold maximum, which is adjusted so that the excitation current does not exceed a preset maximum value; in this embodiment the integral value and the second threshold maximum are sent to the control circuit, which turns off the one-way valve to block the current path when the integral value, as it rises from lower integral values after the current path has been opened, first reaches the second threshold maximum.

A third embodiment of the invention comprises a voltage meter to monitor the unipolar voltage and to generate a voltage measurement corresponding to the unipolar voltage, a first-order delay element with a time constant that corresponds substantially to the duration of the first time segment, to produce a weighted measure from the voltage measurement, and a threshold element to preset a third threshold maximum so adjusted that the excitation current does not exceed a predetermined maximum, in which the control circuit turns off the one-way valve to block the current path when the weighted measure, as it rises from a lower weighted measure after the current path has been opened, first reaches the third threshold maximum.

A fourth embodiment of the invention comprises a voltage meter to monitor a voltage at the terminal connectors of the excitation coil and to produce a corresponding terminal-voltage measurement, a first-order delay element with a time constant the corresponds substantially to the time constant of the excitation coil and preferably is at least twice as long as the period of the unipolar voltage, to produce a weighted second measure from the terminal-voltage measurement, and a threshold element to preset a fourth threshold maximum so adjusted that the excitation current does not exceed a predetermined maximum, wherein the control circuit turns off the one-way valve to block the current path when the weighted second measure, as it rises from a lower weighted second measure after the current path has been opened, first reaches the fourth threshold maximum. In this embodiment a "model" of the excitation current is provided by a voltage measurement.

Preferably in these four embodiments the control circuit includes devices to alter the threshold maximum in dependence on an operating state of the brake, namely raising the brake or keeping it raised, so as to take the operating state of the brake into account. For this purpose the control circuit comprises a timing element by means of which, when current is beginning to flow for the first time in order to raise the brake, the threshold maximum is set at a higher level than when the brake is being held in a raised condition. Thus the dynamic behaviour of the brake is improved and the amount of heating is reduced.

An overvoltage protection device is provided, which monitors a voltage between the main current electrodes and, in order to protect the one-way valve from transient voltages, always turns the one-way valve on when the voltage transiently exceeds an overvoltage limit, which is greater than the maximal value of the unipolar voltage expected during normal operation.

The circuit arrangement further comprises a protective device that turns the one-way valve on whenever a positive voltage exists at the controlled element, and turns it off whenever a negative or zero voltage exists at the controlled element. This circuit arrangement comprises at least one ohmic resistance to connect the controlled element with the unipolar voltage to turn on the one-way valve and a limiting bipolar transistor in parallel to the controlled element, to limit a positive control voltage.

Preferably at least one ohmic resistance and one electronic switch are provided, to short-circuit the controlled element when the one-way valve is turned off.

The timing element comprises at least one ohmic resistance through which a voltage supply is obtained from the unipolar voltage.

The second embodiment comprises at least one ohmic resistance and one capacitor to form the integrator device, at least one ohmic resistance to connect the integrator device with the unipolar voltage during the first time segment, and an electronic switch plus an ohmic resistance to reset the integrator device to zero in the second time segment.

In the third embodiment the first-order delay element comprises at least one ohmic resistance and a capacitor and is connected to the unipolar voltage by at least one ohmic resistance.

The fourth embodiment comprises at least one ohmic resistance and a capacitor to form the first-order delay element, at least one ohmic resistance to connect the first-order delay element to the unipolar voltage when the current path is open, and an electronic switch to short-circuit the first-order delay element at its input side when the current path is blocked.

The preferred implementation of the valve is a switching transistor, preferably an IGBT (Insulated Gate Bipolar Transistor). An IGBT is capable of switching large currents when the operating voltages are high and can be triggered by simple means.

BRIEF DESCRIPTION OF THE DRAWINGS

In the following the invention is explained by description of exemplary embodiments. However, the invention is not limited to these exemplary embodiments. Their description is assisted by the attached drawings, wherein.

DETAILED DESCRIPTION

Figure 1:
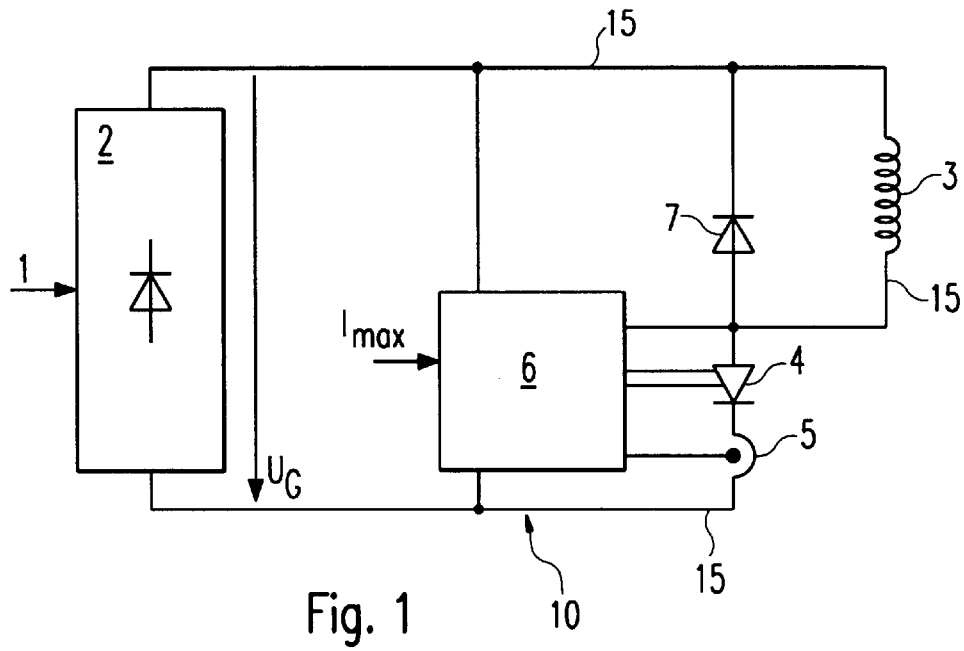
FIG. 1 is the basic circuit diagram of a first exemplary embodiment of the circuit arrangement in accordance with the invention.

In the following description, the same reference numerals are used for identical parts or parts with identical actions.

In the basic circuit diagram of FIG. 1 the reference numeral 1 indicates an alternating-current or three-phase mains supply, which is applied to a voltage source 2, the rectified unipolar output voltage $U_G$ of which is used to operate the excitation coil 3. A current path 15 for the excitation current connects the output terminals of the voltage source 2 to one another. In the current path 15 there are connected in series the excitation coil 3, a valve 4 which is constructed as a one-way valve, and a current sensor 5. Also coupled to the output terminals of the voltage source 2 is the control circuit 6, by means of which the valve 4 can be made non-conducting in dependence on a measurement signal produced by the current sensor 5. The excitation coil 3 is disposed in parallel to a free-run diode 7, through which the excitation current can flow when the valve 4 is shut off because of the inductivity of the excitation coil 3. By this means extreme switching peaks can be avoided. The circuit arrangement thus formed is manufactured as a structural unit either with or without the excitation coil 3.

Figure 2:
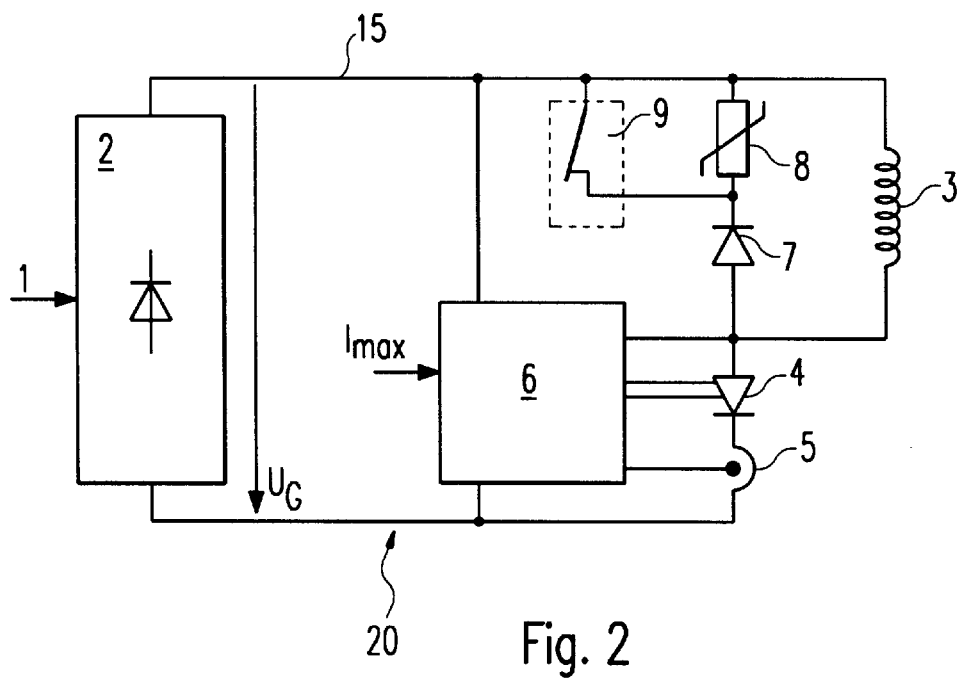
FIG. 2 is the basic circuit diagram of a second exemplary embodiment.

The circuit arrangement shown in FIG. 2 differs from that according to FIG. 1 inasmuch as the former circuit arrangement includes two additional components. In this circuit the excitation coil 3 is connected in parallel with an arrangement in which the free-run diode 7 is connected in series with a varistor 8, the varistor 8 in turn being connected in parallel with a switch contact 9. To shorten the brake application time, i.e. for the rapid operation of an electromagnetically actuated mechanical brake, not only is the a.c. or three-phase mains supply disconnected from the voltage source 2 but, in addition, the excitation coil 3 is turned off directly by the switch contact 9. For its own protection the switch contact 9 is connected parallel to the varistor 8. The turn-on voltage of the varistor 8 is preferably adjusted to be somewhat greater than the peak value of the unipolar voltage $U_G$.

Figure 5:
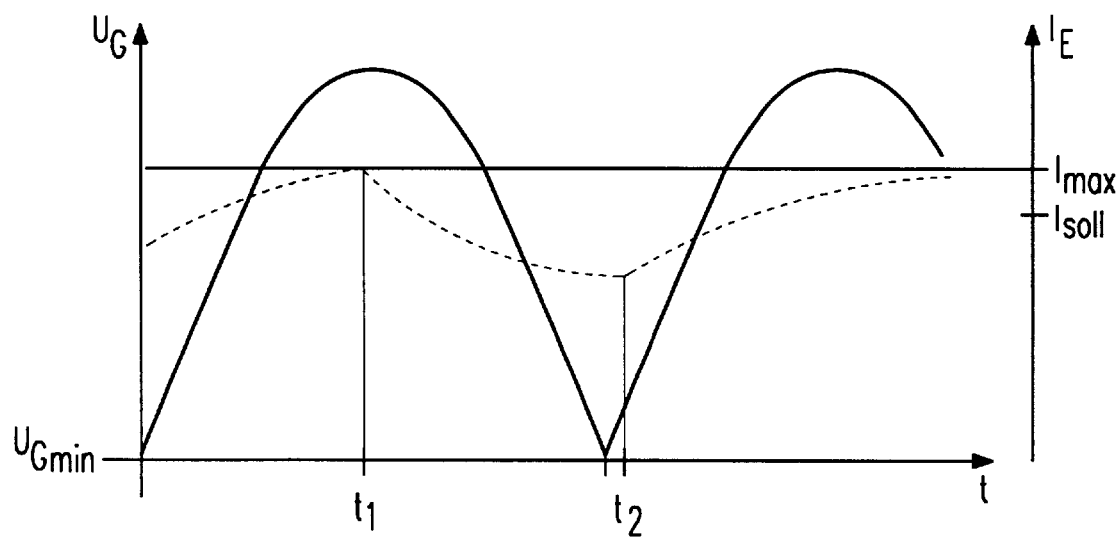
FIG. 5 is a diagram representing the time course of a unipolar voltage and of the excitation current.

With reference to FIG. 5 an exemplary embodiment of the method of adjusting the excitation current of an excitation coil in accordance with the invention will now be described. Reference will also be made to the basic circuit diagram shown as an example in FIG. 1. At an earlier time, not shown in FIG. 5, the (a.c.) supply voltage is turned on, so that from this moment on there appears at the output terminals of the voltage source 2 a secondary, unipolar voltage UG that changes periodically in time.

At the beginning of the first cycle of the unipolar voltage $U_G$ the control circuit 6 puts the valve 4 into an electrically conducting state, so that a certain portion of the unipolar voltage $U_G$, determined by the internal resistance of the excitation coil 3 and the additional resistances along the current path 15, is applied to the excitation coil. Attenuated by the inductivity of the excitation coil 3, the excitation current $I_E$ initially rises with the unipolar voltage $U_G$. Depending on the dimensioning of the components of the circuit arrangement 10, the excitation current $I_E$ can also continue to rise even after the time at which the peak of the unipolar voltage $U_G$ is reached. After a few cycles, at the latest, the excitation current $I_E$ has risen so far that its value averaged over one cycle remains approximately constant.

In particular, given that the time constant $\tau_B$ is formed by the ratio of the inductivity and the ohmic resistance $R_B$ of the excitation coil 3, and is preferably larger than the unipolar voltage period, the excitation current $I_E$ reaches the maximal level $I_{max}$ when the average over time of the voltage at the excitation coil 3 is larger than the product of the ohmic resistance $R_B$ of the excitation coil 3 and a predetermined maximal value $I_{max}$ of the excitation current $I_E$. In the case shown in FIG. 5 this occurs at the moment t1. By way of the measurement signal transmitted to it by the current sensor 5, the control circuit 6 detects this event. The control circuit 6 thereupon turns off the valve 4, as a result of which the current path 15 is blocked. The excitation current $I_E$ is then commutated into the free-run diode 7 and as a result declines. This process continues until the beginning of the following cycle of the unipolar voltage $U_G$. Thereafter, at the moment t2, the control circuit 6 turns the valve 4 on again, so that the current path 15 is opened and the excitation current $I_E$ can rise again. The average over time of the excitation current $I_E$ is therefore at least slightly lower than the maximal current $I_{max}$. The moment t2 preferably occurs as soon as possible after the time at which the unipolar voltage $U_G$ reaches its minimal value ($U_{min}$).

If the peak value of the unipolar voltage $U_G$ is smaller than the product of the ohmic resistance $R_B$ and the maximal current $I_{max}$, the excitation current $I_E$ does not reach the level $I_{max}$. Nevertheless, certain designs of the circuit in accordance with the invention make it possible for the valve 4 to be closed temporarily even in this case, namely within a brief interval during which the unipolar voltage $U_G$ nearly disappears. This time interval, however, as a rule is considerably shorter than the period of the unipolar voltage $U_G$.

Figure 3:
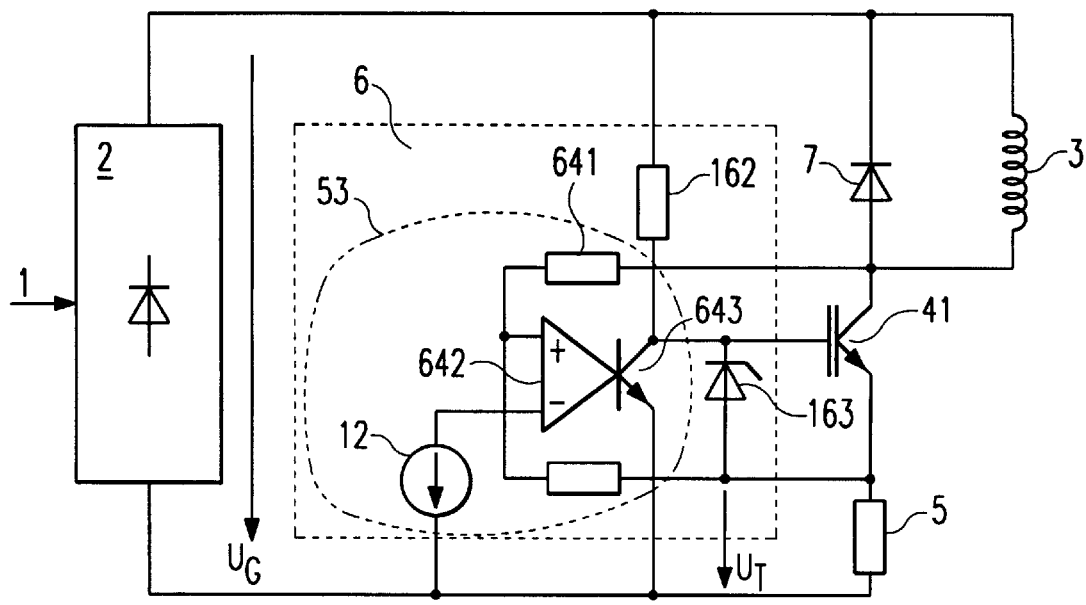
FIG. 3 is the circuit diagram of an exemplary embodiment with a comparator circuit.

The exemplary embodiment of a circuit arrangement in accordance with the invention shown in FIG. 3 comprises a control circuit 6 with a comparator circuit 53. The control circuit 6 further comprises a control resistor 162 and a Zener diode 163. The Zener diode 163 is connected parallel to the controlled element of an IGBT (Insulated Gate Bipolar Transistor) 41 and hence prevents the application of unacceptably high voltages to this controlled element. On the other hand, the Zener diode 163 is chosen to be such that current can be reliably passed through this controlled element. As switch element the comparator circuit 53 includes an operational amplifier 642, which triggers a bipolar transistor 643, the collector of which is connected to one terminal of the voltage source 2 by way of the control resistor 162, the emitter being connected to the other terminal of the voltage source 2. The control resistance 162 is made small enough that the controlled element of the IGBT 41 conducts reliably when the voltage $U_G$ has even a small value, preferably at least an order of magnitude smaller (factor of 0.1) than the peak value of the unipolar voltage $U_G$. In the case of a unipolar voltage $U_G$ that changes periodically in time, therefore, the IGBT 41 is put into the electrically conducting state at the very beginning of a cycle.

To serve as the actuating variable, the control voltage $U_T$ across the sensor resistance 5 is made available to the control circuit 6. A portion of the control voltage $U_T$ is compared, by the comparator circuit 53, with a reference voltage generated by a reference-voltage source 12. The reference voltage is a measure of the maximal value $I_{max}$ of the excitation current. When the excitation current $I_E$ reaches the maximal value $I_{max}$, the control voltage $U_T$ equals the reference voltage. Then the comparator circuit 53 flips, so that the bipolar transistor 643 becomes conducting and the IGBT 41 is put into the electrically non-conducting state. The excitation current $I_E$ is then commutated into the free-run diode 7. Preferably the reference voltage produced by the reference-voltage source 12 can be adjusted externally, for example by way of an adjustment device to control the braking behaviour that is not shown here.

A hysteresis resistor 641 between the non-inverting input of the operational amplifier 642 and the point at which the excitation coil 3 is connected to the IGBT 41 prevents the comparator circuit 53 from flipping back as long as the unipolar voltage $U_G$ has not yet returned to a very small value, which preferably is at least an order of magnitude smaller than the peak value of the unipolar voltage $U_G$.

Figure 4:
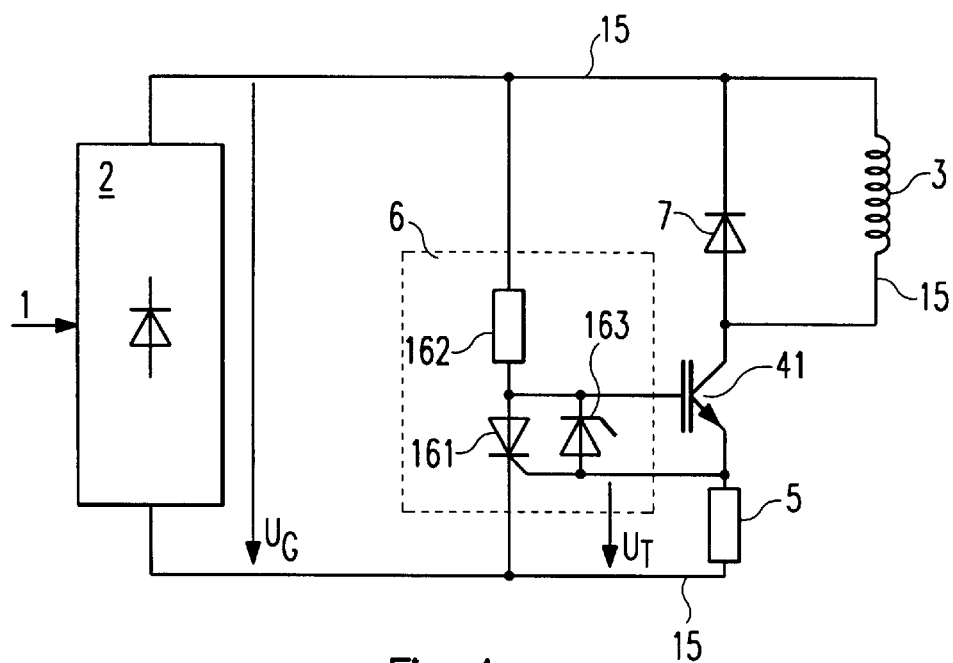
FIG. 4 is the circuit diagram of an exemplary embodiment with a thyristor circuit.

In the circuit arrangement shown in FIG. 4 the control circuit 6 takes over the triggering of the IGBT 41. Here the maximal current $I_{max}$ is derived from the dimensioning of the components of the control circuit 6, of the IGBT 41 and of the sensor resistor 5. The control resistor 162, connected in series with a thyristor 161 between the terminals of the voltage source 2, is chosen such that the controlled element of the IGBT 41 is made reliably conducting even when the unipolar voltage $U_G$ has reached only a very small value, at least an order of magnitude smaller than the peak value of the unipolar voltage $U_G$. The Zener diode 163 connected in parallel with the controlled element of the IGBT 41 is chosen such that on one hand the controlled element of the IGBT 41 is made reliably conducting, whereas on the other hand an unacceptably high voltage load on this controlled element is avoided. The value of the sensor resistor 5 is chosen such that the voltage $U_T$ across it corresponds to the gate voltage of the thyristor 161, when a current with the value of the maximal current $I_{max}$ is flowing through the sensor resistor 5. In this case the thyristor 161 is triggered, i.e. it is put into an electrically conducting state, with the consequence that the connections to the controlled element of the IGBT 41 are short-circuited. As a result, the IGBT 41 blocks the current path 15. The thyristor 161 does not become non-conducting until the unipolar voltage $U_G$ has fallen to 0. The IGBT 41 is therefore not turned on again, opening the current path 15, until approximately the time when the unipolar voltage $U_G$ begins to increase again.

Figure 6:
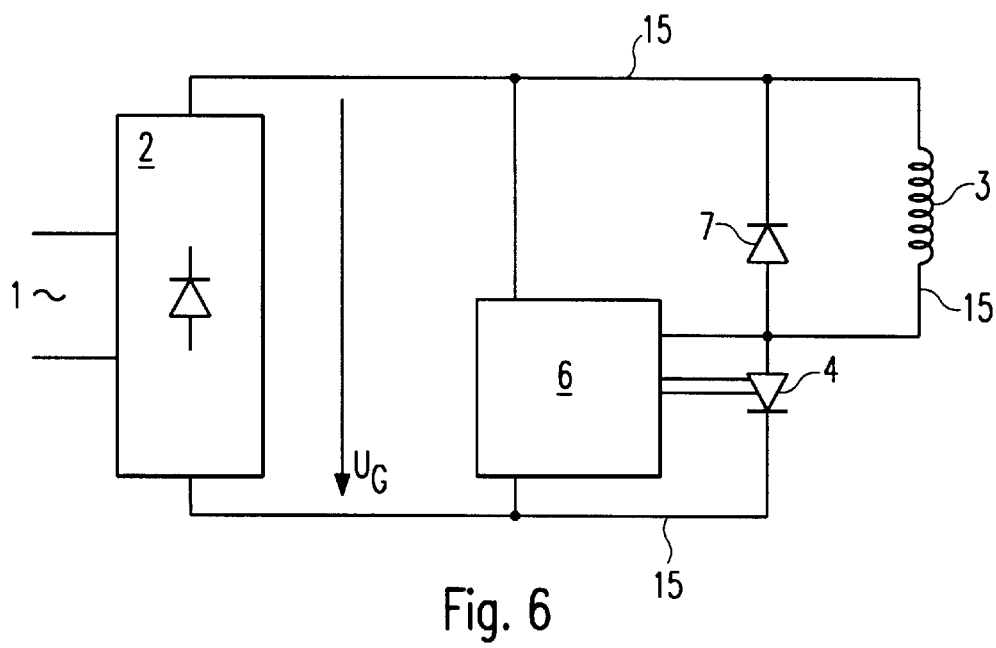
FIG. 6 is the basic circuit diagram of another exemplary embodiment of the circuit arrangement in accordance with the invention.

In the basic circuit diagram shown in FIG. 6, in contrast to those according to FIGS. 1 and 2, no current sensor is provided. Nevertheless, the object stated above is also achieved by this circuit, namely by adjusting the duration of the time segment during which current is supplied to the excitation coil 3. This is explained in detail in the following examples.

Figure 7:
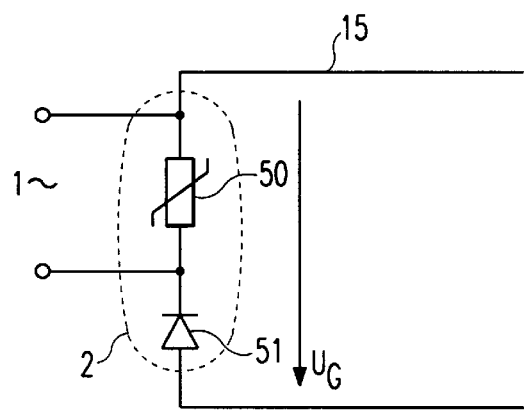
FIG. 7 is the circuit diagram of an arrangement to make available a unipolar voltage.
Figure 8:
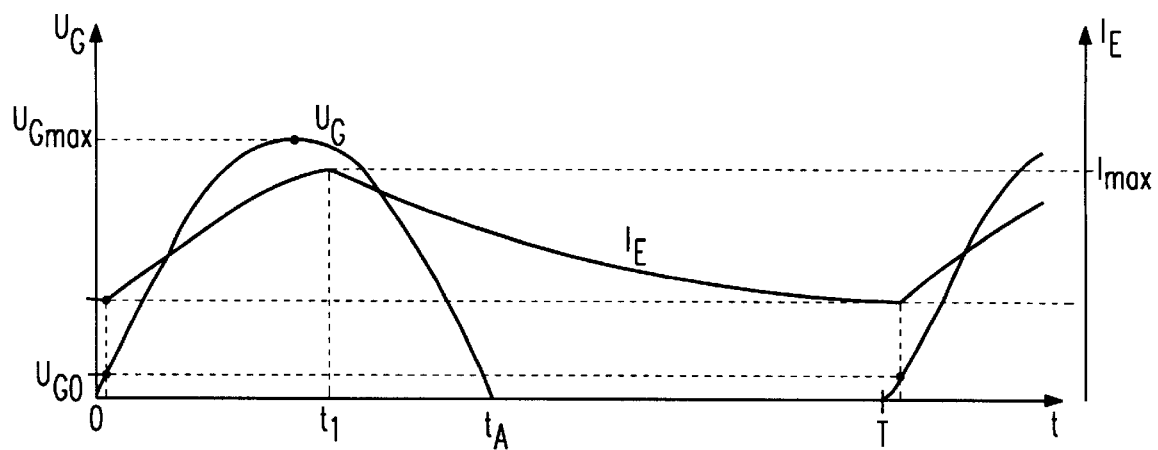
FIG. 8 is a diagram showing the time course of a unipolar voltage that comes from the circuit according to FIG. 7.

First, reference is made to FIGS. 7 and 8, which show an embodiment of the invention in which the voltage source 2 comprises a diode 51 in the current path 15, so that a half-wave rectification of the alternating current coming from the a.c. mains supply 1 is accomplished. Between the terminals of the a.c. mains 1 a varistor 50 is disposed for protection against overvoltages.

The voltage and current time courses are shown in FIG. 8. The diode 51 allows only the positive half-cycle of the alternating current to be conducted, so that the unipolar voltage $U_G$ is present only between time 0 and time $t_A$. During the time $t_A$ to T, i.e. during the second part of the a.c. period 0–T, no voltage is present. In the diagram of FIG. 8 a lower threshold $U_{G0}$ and the maximal value $U_{Gmax}$ of the unipolar voltage $U_G$ are also shown.

The excitation current $I_E$, rises from the time at which the unipolar voltage $U_G$ exceeds the lower threshold $U_{G0}$ until a time t1 at which the excitation current $I_E$ reaches a maximal value $I_{max}$; then it decays until the unipolar voltage $U_G$ again reaches the lower threshold $U_{G0}$ during the next cycle T–2T. The cycle of excitation-current flow thus corresponds in duration to a full cycle of the unipolar voltage $U_G$ but is somewhat shifted in time.

Figure 9:
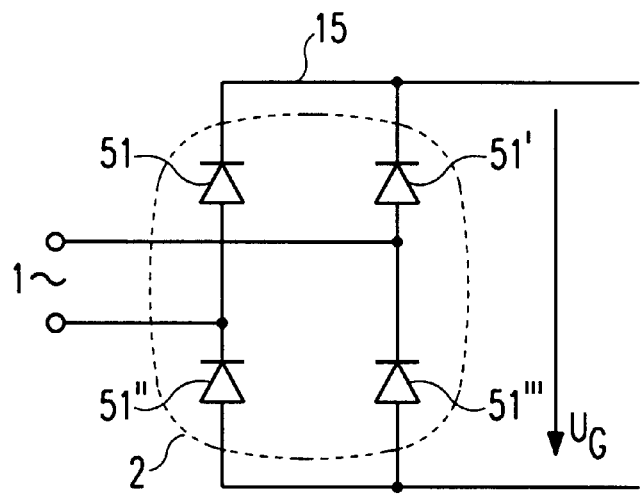
FIG. 9 is the circuit diagram of another exemplary embodiment to produce a unipolar voltage.
Figure 10:
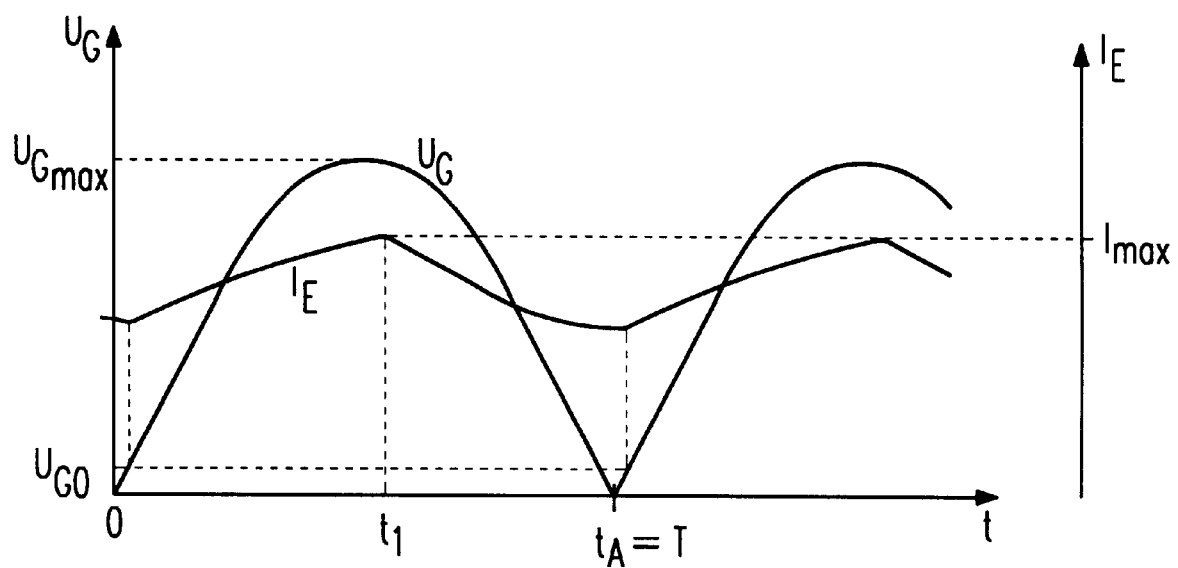
FIG. 10 is a diagram showing the time course of the unipolar voltage from the circuit according to FIG. 9.

In the embodiment of the voltage source 2 shown in FIG. 9 four diodes 51, 51', 51" and 51''' are provided in a bridge arrangement, so that the unipolar voltage $U_G$ has the time course shown in FIG. 10, as is known per se. Here, too, the excitation current $I_E$ rises at the time when the unipolar voltage $U_G$ crosses the lower threshold $U_{G0}$, and it likewise continues to rise until the time t1 at which the excitation current $I_E$ reaches the maximal value $I_{max}$, thereafter declining until the time at which the second half-wave of the unipolar voltage $U_G$ crosses the lower threshold $U_{G0}$. The period in this case is half as long as that in the exemplary embodiment presented above.

In the following, various embodiments of the control circuit are explained with reference to block diagrams.

Figure 11:
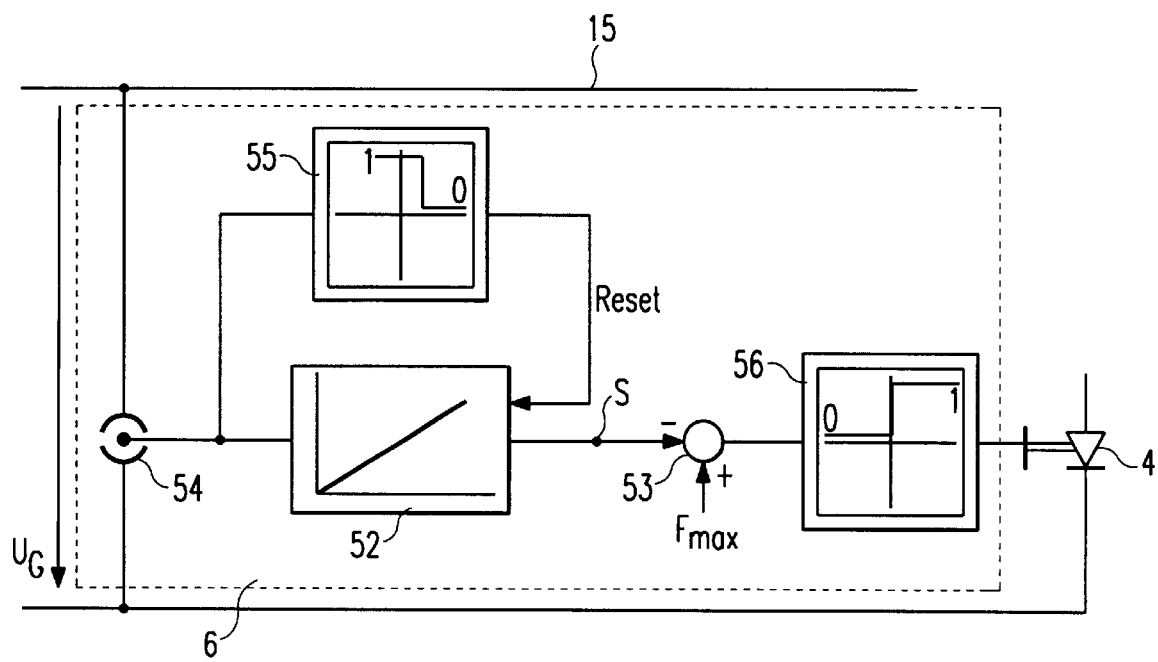
FIG. 11 is the basic circuit diagram of another exemplary embodiment of the circuit arrangement in accordance with the invention.

The embodiment shown in FIG. 11 comprises a voltage sensor 54, which monitors the unipolar voltage $U_G$. The value thus measured is sent to the input of an integrator device 52 and also to the input of a reset switch 55, the output of which is connected to a reset input of the integrator device 52. When the unipolar voltage $U_G$ sensed by the voltage sensor 54 falls below a predetermined level, the reset switch 55 returns the value stored in the integrator device 52 to zero.

The output of the integrator device 52 is sent to a comparator 53, which compares the integral over time of the unipolar voltage $U_G$, as it is formed in the integrator device 52, with a predetermined threshold value $F_{max}$. The result of this comparison is sent to a trigger circuit 56 (corresponding to a Schmitt trigger), the output of which is applied to the controlled element of the electronic one-way valve 4. If the integral value exceeds the threshold maximum $F_{max}$, the one-way valve 4 is turned off.

In the following the function of this arrangement is described, with reference to the time course of the unipolar voltage $U_G$ as shown in FIG. 8 or FIG. 10.

When the voltage $U_G$ is zero (time 0), the reset switch 55 keeps the value of the integral in the integrator device 52 at zero. Now, when the voltage rises, the reset switch 55 releases the reset input of the integrator device 52, so that the device integrates the voltage $U_G$ over time. The integral value is compared with the threshold maximum $F_{max}$. When the integral value reaches the threshold maximum, as is the case at the time designated t1 in FIG. 8 and FIG. 10, the valve 4, which was previously in the on state, is turned off, so that the current path 15 is blocked. At the time $t_A$, at which the unipolar voltage $U_G$ reaches the value zero, the integral value in the integrator device 52 is returned to zero, and it is kept there until the voltage $U_G$ rises again, so that this process begins anew.

Figure 12:
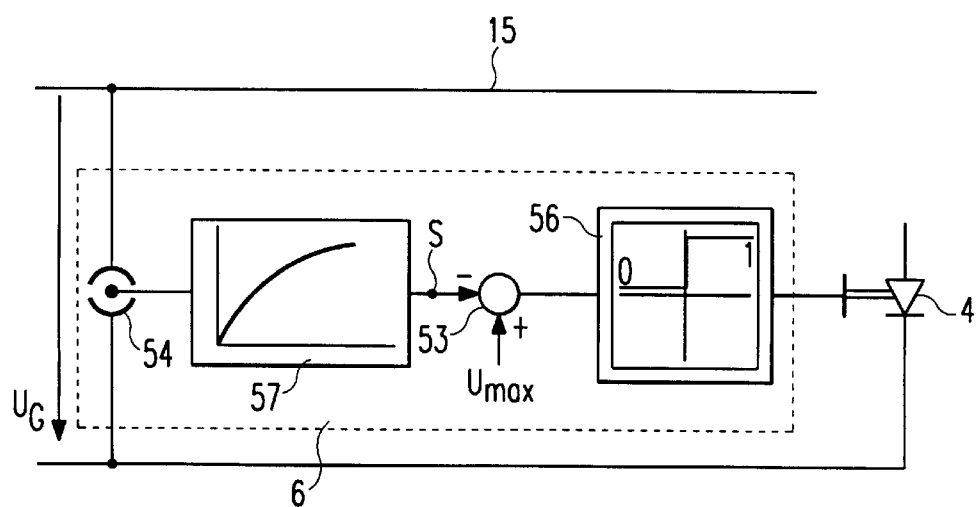
FIG. 12 is the basic circuit diagram of yet another exemplary embodiment of the circuit arrangement in accordance with the invention.

The embodiment of the invention shown in FIG. 12 differs from that according to FIG. 11 in that instead of the integrator device 52 with the reset switch 55, a first-order delay element 57 (low-pass) is provided by which the unipolar voltage $U_G$ is weighted. The current path 15 is closed, by turning off the valve 4, when the weighted value of the unipolar voltage $U_G$ exceeds a threshold maximum $U_{max}$. This threshold maximum $U_{max}$, like the threshold maximum $F_{max}$ in the previous embodiment, is set such that the time t1 at which the valve is turned off coincides with the time at which the maximum of the excitation current $I_{max}$ is reached.

Figure 13:
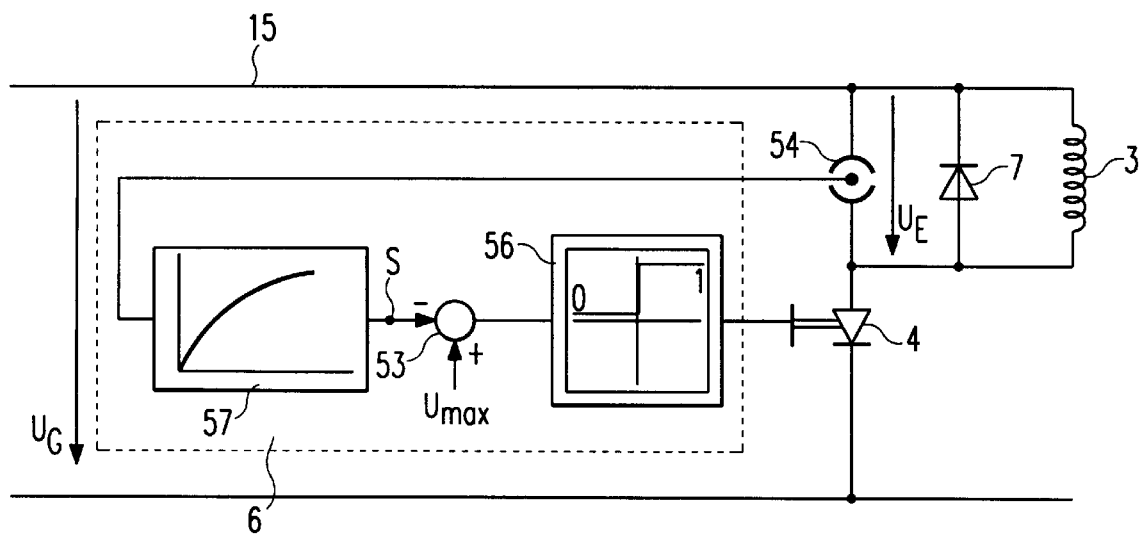
FIG. 13 is the basic circuit diagram of a final exemplary embodiment of the circuit arrangement in accordance with the invention.

The arrangement shown in FIG. 13 differs from that according to FIG. 12 in that not the unipolar voltage $U_G$, but rather the voltage $U_E$ across the terminals of the excitation coil 3 is measured and sent to the delay element 57. In other respects the function is the same. If the time constant of the first-order delay element 57 is chosen to be the same as the time constant $\tau_E$ of the excitation coil 3, the time course of the output voltage of the first-order delay element 57 at point S corresponds exactly to that of the excitation current $I_E$—that is, the voltage is an accurate representation of the current.

Figure 14:
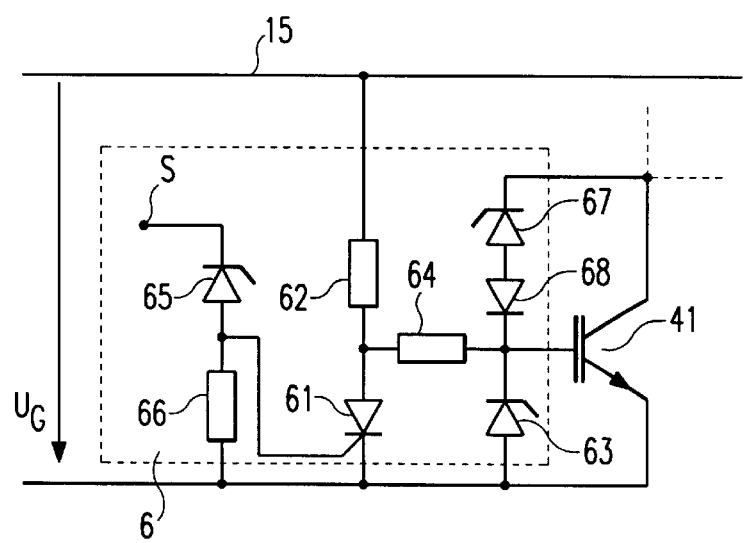
FIG. 14 is the circuit diagram of part of an exemplary embodiment with overvoltage protection for the one-way valve.

In the circuit of FIG. 14 details of the comparator 53, the trigger circuit 56 and the one-way valve 4 are shown. The point S in FIG. 14 can thus be joined to the corresponding point S in the arrangement according to one of the FIGS. 11 to 13, so that the symbolically indicated circuit components 53 and 56 are realized by the circuit according to FIG. 14.

The point S is connected to a Zener diode 65 and a resistor 66 arranged in series. The connection point between the Zener diode 65 and the resistor 66 is connected to the gate of a thyristor 61, which is connected in series with a resistor 62 across the terminals of the voltage source 2. The connection point between the thyristor 61 and the resistor 62 is connected, by way of a resistor 64, to the gate of a valve 41, which in turn is connected to the emitter of the valve by way of a Zener diode 63 and to its collector by way of a Zener diode 67 in series with a diode 68. The valve 41 corresponds to the valve 4 in FIGS. 11 to 13.

The valve 41 is turned on when the unipolar voltage $U_G$ first reaches the value $U_{G0}$. The valve 41 turns off when the signal at the input S (coming from the integrator device 52 or the first-order delay element 57) reaches the threshold value ($U_{max}$ or $F_{max}$, respectively) determined by the sum of the trigger voltage of the thyristor 61 and the Zener voltage of the Zener diode 65. Having been triggered, the thyristor 61 remains conducting regardless of the signal at S, until the unipolar voltage $U_G$ has returned to zero. The diode 68 and the Zener diode 67 provide overvoltage protection for the valve 41, as follows. At voltages above a certain level the Zener diode 67 becomes conducting, thus allowing the current to bypass the valve 41.

The Zener diode 63 in turn protects the controlled element of the valve 41.

Figure 15:
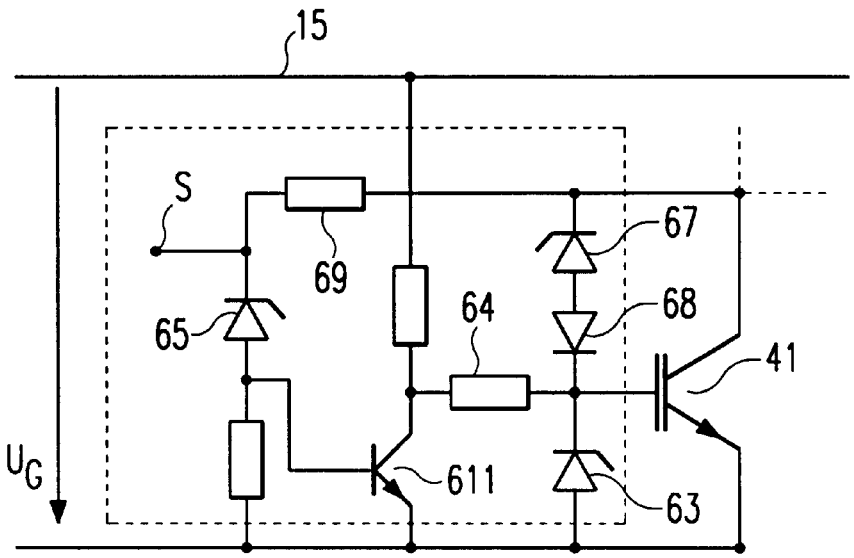
FIG. 15 is the circuit diagram of another embodiment of the arrangement according to FIG. 14.

The circuit shown in FIG. 15 serves substantially the same function as the circuit of FIG. 14. The latching mechanism, corresponding to the property of the thyristor 61 that it remains conducting after having been triggered, in the circuit of FIG. 15 consists in the self-maintaining mechanism of a transistor 611 provided in place of the thyristor 61 shown in FIG. 14. This behaviour is achieved by including in the circuit according to FIG. 15 the resistor 69, which connects the point S to the collector of the valve 41. When the voltage at point S reaches the threshold value ($U_{max}$, $F_{max}$) defined by the Zener diode 65 together with the base voltage of the transistor 611, the transistor 611 turns on. As a result, the base voltage of the transistor 41 is drawn down, so that the transistor 41 becomes non-conducting. Then its collector is substantially at the unipolar voltage $U_G$ (ignoring, for the moment, the voltage drop across the excitation coil 3). Therefore an additional control current for the transistor 611 is obtained from the collector of the transistor 41, by way of the resistor 69 and the Zener diode 65.

Figure 16:
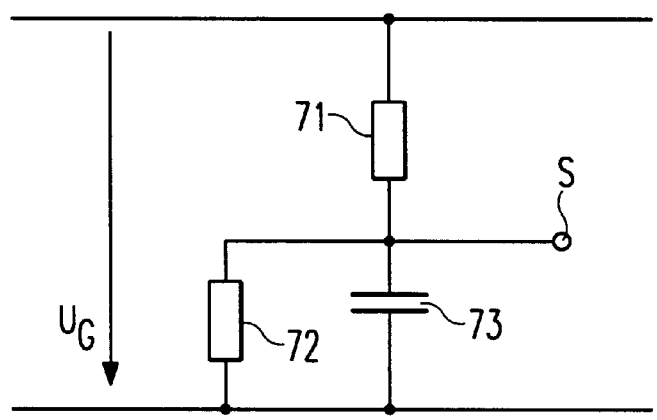
FIG. 16 is a partial circuit diagram to illustrate a first-order delay element.

The circuit according to FIG. 16 comprises a series arrangement of a resistor 71 and a capacitor 73, the latter being connected parallel to a resistor 72. The connection point between the resistor 71 and the capacitor 73 is identified in FIG. 16 as point S. This circuit constitutes a simple form of an integrator device 52, so that the point S can be joined to the similarly designated point S in one of the circuits according to FIG. 14 or FIG. 15, to form a complete control circuit 6. The capacitance of the capacitor 73 and the resistance of the resistors 71 and 72 are chosen to be such that the delay element so formed has a time constant of ca. 10 ms; as the voltage begins to rise in each a.c. cycle, this element behaves approximately like an integrator.

Figure 17:
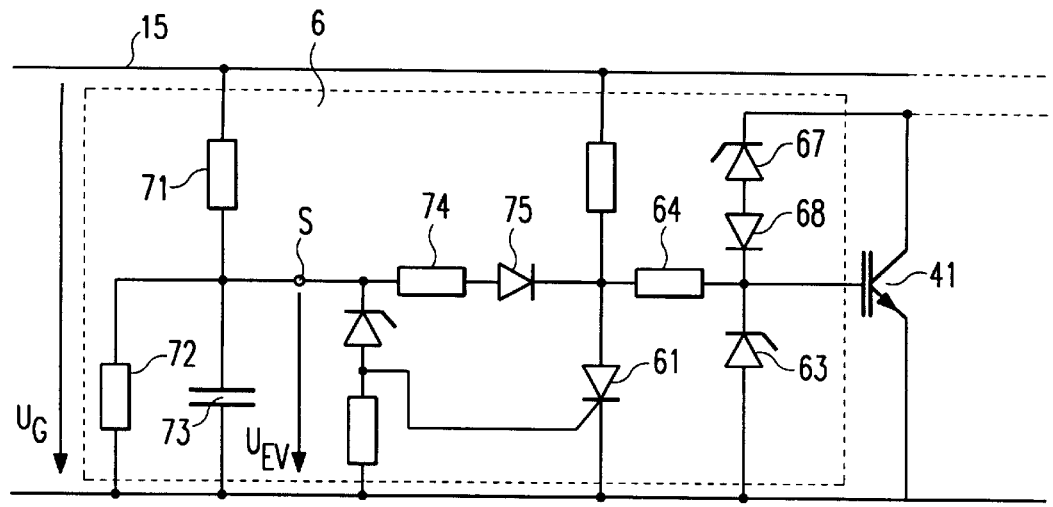
FIG. 17 is a circuit diagram of an exemplary embodiment in which the current path is blocked in dependence on the voltage at the excitation coil.

The variant of the invention shown in FIG. 17 involves a circuit in which the current flowing through the excitation coil 3 is accurately represented by a voltage obtained by suitable dimensioning of the first-order delay element formed by the resistor 71 and the capacitor 73 (which is disposed in parallel with the resistor 72); this voltage $U_{EV}$ appears at the point S. The valve 41 turns on (opening the current path 15) when the voltage $U_G$ is applied to the excitation coil 3. The voltage $U_{EV}$ (at point S) follows with a delay. When the valve 41 turns off, the voltage at the excitation coil 3 is zero, and again the voltage $U_{EV}$ follows with a delay. For this to occur, the resistance 71 in the first-order delay element of FIG. 17 must be very much larger than the resistance 72, which in turn must be larger than the resistance 74. The remaining elements of the circuit can be seen directly in FIG. 17.

Figure 18:
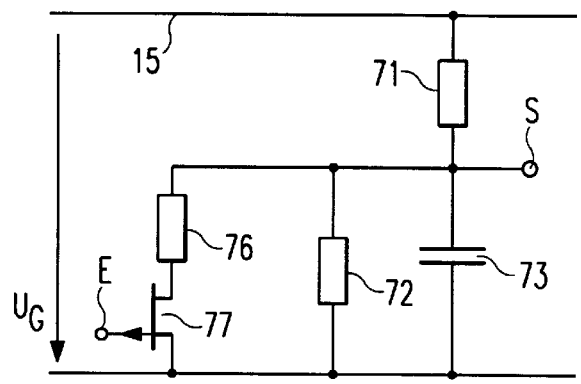
FIG. 18 is the circuit diagram of an arrangement to produce an elevated voltage for the turning-on process.

In the circuit shown in FIG. 18 a turn-on elevation is implemented, namely an increase in the excitation current $I_E$ that flows through the excitation coil 3 while the brake is being lifted, in comparison with that flowing while the brake is kept in the raised state. To produce this transient increase, the action of the first-order delay element 57 that weights the measured value of the voltage $U_G$ is reduced during a time interval $T_E$ (which coincides with the lifting process), by turning on an auxiliary transistor 77 constructed as a self-conducting transistor. This transistor 77 is disposed in series with a resistor 76 to form a branch connected parallel to the capacitor 73 and the resistor 72.

Figure 19:
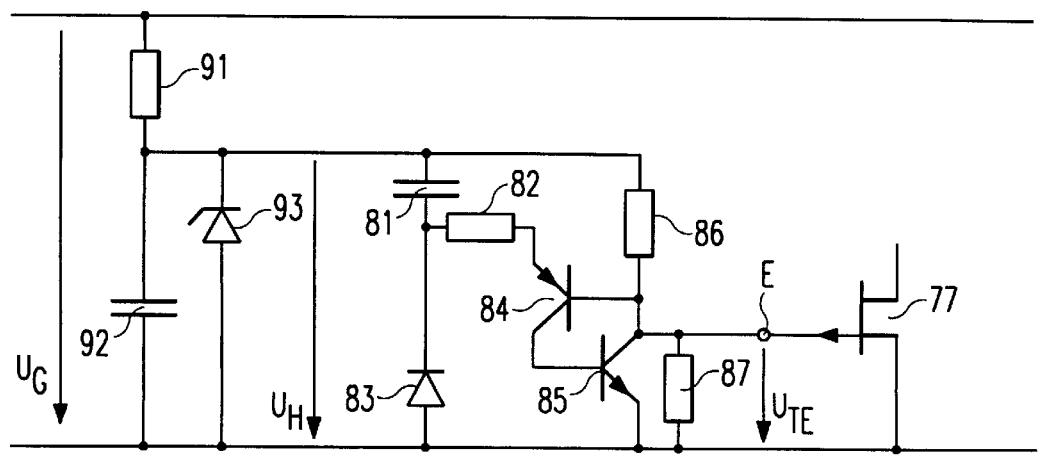
FIG. 19 is the circuit diagram of another arrangement to implement an elevated turn-on voltage.

FIG. 19 shows a circuit to produce the signal that controls the transistor 77 according to FIG. 18. With the Zener diode 93 and the capacitor 92 shown in FIG. 19, a stabilized d.c. voltage $U_H$ is produced. The time interval $T_E$ mentioned above is determined substantially by the capacitance of the capacitor 81 and the resistance of the resistor 82. Initially the connection point between the capacitor 81 and the resistor 82 is nearly at the level of $U_H$. From the collector of the transistor 84 current flows to the base of the transistor 85 and hence to its collector. As a result, the transistors 84 and 85 become conducting. The voltage $U_{TE}$ at point E thus becomes approximately zero, so that the transistor 77 (see FIG. 18) becomes conducting. Now when the capacitor 81 is charged to substantially the voltage $U_H$, by way of the resistor 82, the connection point between the capacitor 81 and the resistor 82 is nearly at zero voltage. Therefore no more current flows through the resistor 82 to the collector 84, and hence the transistors 84 and 85 become non-conducting, so that the transistor 77 is also non-conducting. The voltage $U_{TE}$ rises towards the level $U_H$ by way of the voltage divider formed by the resistors 86 and 87. The diode 83 discharges the capacitor 81 when the unipolar voltage $U_G$ has been zero for a long time, i.e. for many a.c. cycles. Hence the circuit according to FIG. 19 exhibits bistable behaviour.

The above descriptions make it evident that someone skilled in the art can implement the method described at the outset with a variety of circuit designs. For industrial production, however, it is desirable to employ the simplest and most economical variants with which the relatively high manufacturing accuracy of capacitors, resistors and Zener diodes can be relied upon to achieve precise characteristic time constants, and in which the circuitry is not too laborious or costly to construct.

On the basis of the circuit arrangement in accordance with the invention and/or the method in accordance with the invention, it is now possible to operate the same type of excitation coil with a wide range of supply voltages. As a result, a given type of excitation coil can be manufactured in greater numbers. This large-scale manufacture is advantageous with respect to the costs of development, raw materials and tools, processing and testing equipment, and the logistics of storage and marketing.

What is claimed is:

1. Method for the operation of an electromagnetically actuated mechanical brake of an electric motor, in particular a geared motor,
   with an excitation coil for the actuation, in particular lifting of the brake,
   with an a.c. mains supply, the voltage of which alternates cyclically with an a.c. period ($T_W$),
   such that the excitation coil has a time constant ($\square B$) corresponding to a ratio of a coil inductivity and an ohmic coil resistance, wherein
      to operate the brake with mains voltages within a wide voltage range a unipolar voltage ($U_G$) that changes with a period (T) is generated by a voltage source,
      the unipolar voltage ($U_G$) in a first time segment (0 to $t_A$) of the voltage period (T) is positive and different from zero and in this first segment (0 to $t_A$) has a maximal value ($U_{Gmax}$), and in a second time segment ($t_A$ to T) of the voltage period (T) is zero or at least approaches zero,
      a current path is opened for an excitation current to flow from the voltage source to the excitation coil substantially at the beginning of the first time segment (0 to $t_A$),
      the current path is blocked again at a certain point in time ($t_1 \leq t_A$) within the first time segment (0 to $t_A$) the certain point in time ($t_1 \leq t_A$) being chosen such that the excitation current does not exceed a predetermined maximal value ($I_{max}$), and wherein
         during a time interval in which the excitation coil is or should be permanently excited, opening and blocking of the current path is repeated in each voltage cycle (T).

2. Method according to claim 1, wherein the unipolar voltage $U_G$ is generated by a rectifier unit in the voltage source from a single-phase mains voltage of the a.c. mains, in such a way that the first time segment (0 to $t_A$) coincides with substantially all of the a.c. period ($T_W$), so that the second segment ($t_A$ to T) is very short, and wherein the voltage period (T) corresponds to half the a.c. period ($T_W$).

3. Method according to claim 1, wherein the first and the second segments (0 to $t_A$, $t_A$ to T) each correspond to half the voltage period (T) and half the a.c. period ($T_W$).

4. Method according to claim 1, wherein the current path is opened or blocked by way of main current electrodes of an electronic one-way valve that can be turned on and off by means of a controlled element, the current path being opened when the one-way valve is turned on and blocked when it is turned off, and wherein when the one-way valve is turned off, a discharge current from the excitation coil is conducted through a free path parallel to the excitation coil with a decay time course corresponding substantially to the time constant ($\tau_B$) of the excitation coil.

5. Method according to claim 4, wherein to protect against transient overvoltages the one-way valve is always turned on, regardless of other control signals, when a voltage between its main current electrodes, during the transient overvoltage, exceeds an overvoltage limit ($U_{Grenz}$) that is greater than the maximal value ($U_{Gmax}$) of the unipolar voltage ($U_G$) expected during normal operation.

6. Method according to claim 4, wherein the one-way valve is turned on when a positive voltage is applied to its controlled element and is turned off when the voltage at the controlled element is negative or zero.

7. Method according to claim 6, wherein in order to turn on the one-way valve the unipolar voltage ($U_G$) is applied to its controlled element by way of at least one ohmic resistance and the positive control voltage is preferably limited by a bipolar transistor.

8. Method according to claim 6, wherein in order to turn off the one-way valve the controlled element is short-circuited by way of at least one ohmic resistance and an electronic switch.

9. Method according to claim 1, wherein the current path is opened when the unipolar voltage ($U_G$), as it rises from zero, first reaches a positive threshold value ($U_{G0}$), which is considerably lower than the maximal value ($U_{Gmax}$).

10. Method according to claim 1, wherein the excitation current is measured and the current path is blocked when the excitation current, as it rises from lower current levels after the current path has been opened, for the first time reaches a first threshold maximum ($I_{max}$).

11. Method according to claim 10, wherein the predetermined threshold maximum ($I_{max}$) is changed in dependence on an operating state of the brake, in particular in dependence on a raising of the brake and on its being kept in the raised state.

12. Method according to claim 11, wherein at the beginning of an initial flow of current provided to raise the brake, the predetermined threshold maximum ($I_{max}$, $F_{max}$, $U_{max}$) is set at a level higher than that for keeping the brake raised, after which it remains at the higher level for an elevation interval ($T_E$).

13. Method according to claim 12, wherein the elevation interval ($T_E$) is greater than or equal to the time constant ($\tau_B$) of the excitation coil.

14. Method according to claim 12, wherein the elevation interval ($T_E$) is at least twice as long as the period (T) of the unipolar voltage ($U_G$).

15. Method according to claim 12, wherein the elevation interval ($T_E$) is controlled by a timing element in such a way that the elevation interval ($T_E$) begins when, as a result of switching on the mains voltage from the a.c. mains supply in order to raise the brake, the unipolar voltage ($U_G$) first reaches a predetermined threshold value ($U_{GI}$) that is considerably lower than the maximal value ($U_{Gmax}$).

16. Method according to claim 1, wherein the unipolar voltage ($U_G$) is measured and an integral value of the unipolar voltage ($U_G$) is obtained as it rises from zero during the first time segment (0 to $t_A$), and wherein the current path is blocked when the integral value, as it rises from lower integral values after the current path has been opened, for the first time reaches a predetermined second threshold maximum ($F_{max}$), the second threshold maximum ($F_{max}$) being chosen such that the excitation current does not exceed a predetermined maximum ($I_{max}$).

17. Method according to claim 16, wherein the integral value is reset to zero during the second time segment ($t_A$ to T).

18. Method according to claim 16, wherein the predetermined threshold maximum ($F_{max}$) is changed in dependence on an operating state of the brake, in particular in dependence on a raising of the brake and on its being kept in the raised state.

19. Method according to claim 1, wherein the unipolar voltage ($U_G$) is measured and by means of a first-order delay element a first weighted measure of the unipolar voltage ($U_G$) is obtained, and wherein the current path is blocked when the first weighted measure, as it rises from lower values of this weighted measure after the current path has been opened, for the first time reaches a predetermined third threshold maximum ($U_{max}$), a time constant of the delay element being set to correspond substantially to the duration of the first time segment (0 to $t_A$) and the third threshold maximum ($U_{max}$) being chosen such that the excitation current does not exceed a predetermined maximum ($I_{max}$).

20. Method according to claim 19, wherein the predetermined threshold maximum ($U_{max}$) is changed in dependence on an operating state of the brake, in particular in dependence on a raising of the brake and on its being kept in the raised state.

21. Method according to claim 1, wherein a voltage ($U_E$) along the excitation coil is measured and by means of a first-order delay element a weighted second measure of this voltage is obtained, and wherein the current path is blocked when the second measure, as it rises from lower values after the current path has been opened, for the first time reaches a predetermined fourth threshold maximum ($U_{max}$), a time constant of the first-order delay element being set to correspond substantially to the time constant ($\square_B$) of the excitation coil and being preferably at least twice as long as the period (T) of the unipolar voltage ($U_G$), and the fourth threshold maximum ($U_{max}$) being chosen such that the excitation current does not exceed a predetermined maximum ($I_{max}$).

22. Method according to claim 21, wherein the first-order delay element is connected to the voltage ($U_G$) along the excitation coil while the current path is opened, and is short-circuited at its input side by way of an electronic switch while the current path is blocked.

23. Method according to claim 21, wherein the predetermined threshold maximum ($U_{max}$) is changed in dependence on an operating state of the brake, in particular in dependence on a raising of the brake and on its being kept in the raised state.

24. Circuit arrangement for the operation of an electromechanically actuated mechanical brake of an electric motor, in particular a geared motor, with mains voltages over a wide voltage range, comprising an excitation coil with terminal connectors, which has a time constant ($\tau_B$) corresponding to a ratio between a coil inductivity and an ohmic coil resistance, to actuate, in particular to raise, the brake;

an alternating-current mains supply that delivers a mains voltage with an a.c. period ($T_W$);

a voltage source to generate a unipolar voltage ($U_G$) that changes with a period (T), which in a first time segment (0 to $t_A$) of the voltage period (T) is positive and different from zero and in this first time segment (0 to $t_A$) has a maximal value ($U_{Gmax}$) and which in a second time segment ($t_A$ to T) of the voltage period is zero or at least approaches zero;

a current path for an excitation current that passes from the voltage source to the excitation coil and back;

an electronic one-way valve with main current electrodes, through which the current path passes so that the current path can be opened and blocked, and with a controlled system to turn the one-way valve on and off;

a control circuit that is connected to the controlled element and so constructed that in order to open the current path the one-way valve is turned on substantially at the beginning of the first time segment (0 to $t_A$) and to block the current path is turned off at a particular point in time ($t_1 \leq t_A$) within the first time segment (0 to $t_A$), wherein the control circuit is further so constructed that the excitation current does not exceed a predetermined maximal value ($I_{max}$) and during a time span in which the excitation coil is or should be permanently excited, the turning on and off of the one-way valve is repeated in each voltage period (T) to open and block the current path.

25. Circuit arrangement according to claim 24, wherein the voltage source is connected on its input side to a single-phase mains voltage from the a.c. mains supply and comprises a diode-bridge circuit, so that the first time segment (0 to $t_A$) comprises substantially the entire a.c. period ($T_W$) and the second time segment ($t_{A\ to\ tW}$) is very short, the period (T) corresponding substantially to half the a.c. period ($T_W$).

26. Circuit arrangement according to claim 24, wherein the voltage source comprises a diode-midpoint arrangement, so that the first and the second time segments (0 to $t_A$; $t_A$ to T) each correspond to half the voltage period (T) and half the a.c. period ($T_W$).

27. Circuit arrangement according to claim 24, wherein a free-run path is disposed parallel to the terminal connectors of the excitation coil, being so connected that after the current path has been blocked, the excitation coil is discharged with a discharge time constant corresponding to the time constant ($\tau_B$) of the excitation coil.

28. Circuit arrangement according to claim 24, comprising a voltage meter to monitor the unipolar voltage ($U_G$) and a threshold element to preset a positive threshold value ($U_{G0}$), wherein the control device turns on the one-way valve to open the current path when the unipolar voltage ($U_G$), as it rises from zero, first reaches the positive threshold value ($U_{G0}$), which is considerably lower than the maximal value ($U_{Gmax}$).

29. Circuit arrangement according to claim 24, comprising a current meter to generate a current signal corresponding to the excitation current, and a threshold element to preset a first threshold maximum ($I_{max}$) wherein to block the current path the control circuit turns off the one-way valve when the current signal, as it rises from lower current signals after the current path has been opened, for the first time reaches the first threshold maximum ($I_{max}$).

30. Circuit arrangement according to claim 29, wherein the control circuit comprises devices to alter the threshold maximum ($I_{max}$) in dependence on an operating state of the brake while the brake is being raised and while it is being kept in the raised state.

31. Circuit arrangement according to claim 30, wherein the control circuit comprises a timing element by means of which, at the beginning of a first supply of current for raising the brake, the threshold maximum ($I_{max}$, $F_{max}$, $U_{max}$) is shifted for an elevation interval ($T_E$) to a level higher than the level while the brake is being kept in the raised state.

32. Circuit arrangement according to claim 31, comprising at least one ohmic resistance to supply the timing element with voltage from the unipolar voltage ($U_G$).

33. Circuit arrangement according to claim 24, comprising an integrator device to form an integral value, beginning at zero, of the unipolar voltage ($U_G$) over the first time segment (0 to $t_A$) and a threshold element to preset a second threshold maximum ($F_{max}$) at a level such that the excitation current does not exceed a predetemined maximum ($I_{max}$), wherein the integral value and the second threshold maximum ($F_{max}$) are sent to the control circuit so that the one-way valve is turned off and the current path blocked when the integral value, rising from lower integral values after the current path has been opened, first reaches the second threshold maximum ($F_{max}$).

34. Circuit arrangement according to claim 33, comprising at least one ohmic resistance and a capacitor to form the integrator device, at least one ohmic resistance to connect the integrator device to the unipolar voltage ($U_G$) during the first time segment (0 to $t_A$), and an electronic switch and an ohmic resistance to reset the integrator device to the value zero in the second time segment ($t_A$ to T).

35. Circuit arrangement according to claim 33, wherein the control circuit comprises devices to alter the threshold maximum ($F_{max}$) in dependence on an operating state of the brake while the brake is being raised and while it is being kept in the raised state.

36. Circuit arrangement according to claim 24, comprising a voltage meter to monitor the unipolar voltage ($U_G$) and to produce a voltage measurement corresponding to the unipolar voltage ($U_G$), a first-order delay element with a time constant that corresponds substantially to the duration of the first time segment (0 to $t_A$) to produce a weighted measure from the voltage measurement, and a threshold element to preset a third threshold maximum ($U_{max}$) at a level such that the excitation current does not exceed a predetemined maximum ($I_{max}$), wherein to block the current path the control circuit turns off the one-way valve when the weighted measure, rising from a lower weighted measure after the current path has been opened, first reaches the third threshold maximum ($U_{max}$).

37. Circuit arrangement according to claim 36, wherein the first-order delay element comprises at least one ohmic resistance and a capacitor and is connected to the unipolar voltage ($U_G$) by way of at least one ohmic resistance.

38. Circuit arrangement according to claim 36, wherein the control circuit comprises devices to alter the threshold maximum ($U_{max}$) in dependence on an operating state of the brake while the brake is being raised and while it is being kept in the raised state.

39. Circuit arrangement according to claim 24, comprising a voltage meter to monitor a voltage at the terminal connectors of the excitation coil and to produce a corresponding terminal-voltage measurement, a first-order delay element with a time constant that corresponds substantially to the time constant ($\tau_B$) of the excitation coil and preferably is at least twice as long as the period (T) of the unipolar voltage ($U_G$), to produce a weighted second measure from the terminal-voltage measurement, and a threshold element to preset a fourth threshold maximum ($U_{max}$) at a level such that the excitation current does not exceed a predetermined maximum ($I_{max}$) so that to block the current path the control circuit turns off the one-way valve when the weighted second measure, rising from lower values after the current path has been opened, first reaches the fourth threshold maximum ($U_{max}$).

40. Circuit arrangement according to claim 39, comprising at least one ohmic resistance and a capacitor to form the first-order delay element, at least one ohmic resistance to connect the first-order delay element to the unipolar voltage ($U_G$) when the current path is open, and an electronic switch to short-circuit the first-order delay element at its input side when the current path is blocked.

41. Circuit arrangement according to claim 39, wherein the control circuit comprises devices to alter the threshold maximum ($U_{max}$) in dependence on an operating state of the brake while the brake is being raised and while it is being kept in the raised state.

42. Circuit arrangement according to claim 24, comprising an overvoltage protection device that monitors a voltage between the main current electrodes and always turns off the one-way valve, to protect it from transient voltages, when the voltage temporarily exceeds an overvoltage limit ($U_{Grenz}$), which is higher than the maximal value ($U_{Gmax}$) of the unipolar voltage ($U_G$) that is expected in normal operation.

43. Circuit arrangement according to claim 24, comprising a protective device that turns the one-way valve on when a positive voltage is applied to the controlled element and turns it off when the voltage at the controlled element is negative or zero.

44. Circuit arrangement according to claim 43, comprising at least one ohmic resistance to connect the controlled element to the unipolar voltage ($U_G$) in order to turn on the one-way valve and a limiting bipolar transistor connected parallel to the controlled element in order to limit a positive control voltage.

45. Circuit arrangement according to claim 43, comprising at least one ohmic resistance and an electronic switch to short-circuit the controlled element when the one-way valve is turned off.

* * * * *

UNITED STATES PATENT AND TRADEMARK OFFICE
CERTIFICATE OF CORRECTION

PATENT NO. : 6,291,952 B1
DATED : September 18, 2001
INVENTOR(S) : Jörg Roth-Stielow, et al.

It is certified that error appears in the above-identified patent and that said Letters Patent is hereby corrected as shown below:

Column 13,
Line 35, "$(t_1 \geqq t_A)$" should be changed to -- $(t_1 \leq t_A)$ --.
Line 36, "$(t_1 \geqq t_A)$" should be changed to -- $(t_1 \leq t_A)$ --.

Column 15,
Line 54, "$(U_{Gmax})$" should be changed to -- $(U_{Gmax})$, --

Column 16,
Line 2, "$(t1 \geqq t_A)$" should be changed to -- $(t1 \leq t_A)$ --.
Line 16, "$(t_{A\ to\ tW})$" should be changed to -- $(t_A \text{ to } t_w)$ --.
Line 41, "$(I_{max})$" should be changed to -- $(I_{max})$, --.

Column 18,
Line 5, "$(I_{max})$" should be changed to -- $(I_{max})$, --.

Signed and Sealed this

Twenty-second Day of October, 2002

Attest:

Attesting Officer

JAMES E. ROGAN
Director of the United States Patent and Trademark Office